Patented Feb. 13, 1945

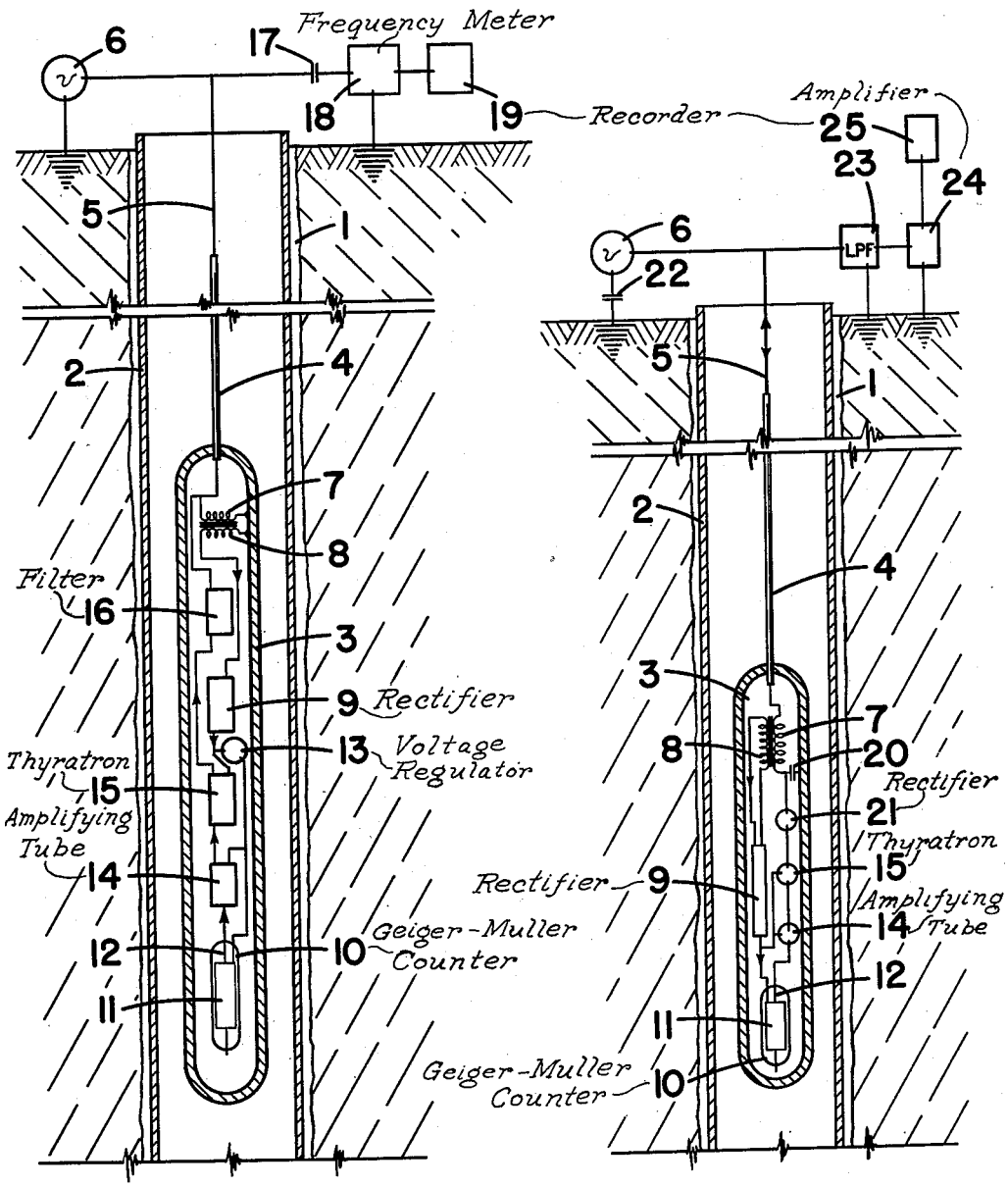

2,369,550

UNITED STATES PATENT OFFICE 2,369,550

WELL LOGGING

Alex Frosch, Houston, Tex., assignor to Standard Oil Development Company, a corporation of Delaware Application June 30, 1941, Serial No. 400,444

13 Claims. (Cl. 250—83.6)

The present invention is directed to gamma ray well logging and resides in a method and apparatus for making gamma ray well logs by the use of a Geiger-Müller counter.

In the logging of boreholes by the measurement of the gamma ray intensity along the boreholes by passing a Geiger-Müller counter along the borehole difficulties are encountered in supplying the necessary voltage to operate the Geiger-Müller counter. This voltage will ordinarily be in the neighborhood of 1000 volts, and when this voltage is transmitted through several thousand feet of cable, large drops are encountered. A more important difficulty, however, is that insulation is not readily available which will prevent the leakage of the voltage from the conductor to the fluid in the borehole. When the voltage is supplied by placing batteries in the bomb used for logging, the bomb must necessarily be made larger and heavier and becomes unwieldly to manipulate. Furthermore, the batteries must be periodically replaced, thereby increasing the maintenance cost. Another disadvantage is that the voltage of batteries varies with temperature with the result that errors are introduced into the well log. As a matter of fact, some of the temperatures encountered in boreholes are above those which a battery is capable of withstanding whereby destruction of batteries is fairly frequent.

The principal object of the present invention is the provision of a method of working and a system which permit the operation of a Geiger-Müller counter in a borehole by alternating current supply at the surface and the continuous return to the surface of the signals from the counter, while utilizing a single conductor cable.

Briefly, according to the present invention, alternating current power is transmitted to the borehole bomb where it is transformed and rectified to supply the necessary direct current voltage for the operation of the Geiger-Müller counter and the responses of the counter are transmitted to the surface over the same conductor either as alternating current pulses or a varying direct current. When it is desired to transmit to the surface a signal in the form of alternating current pulses, the frequency of the alternating current supply is so selected as to differ considerably from the frequency of the alternating current signals so that the two can be separated.

The present invention may be more readily understood from the following detailed description of the accompanying drawing in which—

Figure 1 is a vertical section, partly in diagrammatic form, of one form of apparatus according to the present invention placed in a borehole; and Figure 2 is a similar view of another embodiment of the present invention.

Referring to the drawing in detail, numeral 1 designates a borehole provided with casing 2. Suspended in the borehole is a bomb 3 made of steel or other material transparent to gamma rays and of sufficient mechanical strength to withstand the pressures encountered in the borehole. It will be understood that this bomb is made fluid-tight to protect the equipment container. The bomb is carried by a cable 4 in which is a single conductor 5 which is connected at the surface to an alternating current generator 6. Connected to the conductor 5 inside the bomb 3 is one terminal of the primary 7 of a transformer the other terminal of which is grounded. The secondary 8 of this transformer has one terminal grounded and the other terminal connected to the input end of a rectifier 9 which may be any of the conventional types of rectifier. The output of the rectifier is fed to a Geiger-Müller counter 10 in which it is applied to the cathode 11 to set up a difference in direct current potential between the latter and the anode 12. If desired, a voltage regulator 13 of any conventional type, such as the neon tube type described in an article entitled "Voltage sources and amplifiers for Geiger counters," by H. S. Gingrich, appearing in the May 1936 issue of Review of Scientific Instruments, vol. 7, pages 207–210, may be interposed between the rectifier and the Geiger-Müller counter. The output of the rectifier also supplies the plate voltages for an amplifying tube 14 and a thyratron 15.

Thus, it will be seen that, in the system shown, alternating current power of 60 cycles and 110 volts may be supplied at the surface and transformed in the bomb to power of any desired voltage, such as 1000 volts, which is rectified and applied as direct current voltage to the Geiger-Müller counter.

The anode 12 of the Geiger-Müller counter is connected in a manner already known to the grid of an amplifying tube 14 the plate of which is, in turn, connected to the grid of a thyratron tube 15. These tubes are symbolically represented, since they are of well known construction and are fairly standardized. The output of the thyratron tube in this case is a pulse of a frequency depending upon the gamma ray intensity to which the Geiger-Müller counter is subjected. It thus has the characteristics of an alternating current. The thyratron also acts as a leveler and makes all of the pulses of substantially constant amplitude regardless of the character of the actual counter pulses. This output is fed to conductor 5 above the primary 7. Interposed between the thyratron and the conductor 5 is a filter 16 which is so selected as to exclude from the circuit below the filter the power supply current, while permitting the passage upwardly of the output from the thyratron.

Ordinarily, the frequency or pulse rate of the impulses put out by the thyratron will be considerably below 60 cycles. These pulses, however, are very sharp and therefore made up of frequencies many times greater than 60 cycles. Accordingly, there is considerable latitude permitted in the selection of a filter which will effectively prevent the power supply from reaching the thyratron tube while permitting the high frequency components of the thyratron output to reach conductor 5. It may be mentioned here that the thyratron may be omitted if desired, providing its absence is compensated for by sufficient amplification.

At the surface conductor 5 is also connected through a filter 17, which may be a condenser, to a frequency meter 18 the output of which is fed to a recorder 19 which is generally of the photographic type in which a beam of light, the movement of which is controlled by the output of the frequency meter, moves across a sensitized strip, the rate of motion of which is synchronized with the movement of the bomb in the borehole so that the values recorded are automatically correlated with depth. In this connection it will be understood that, as is usual in well logging practice, cable 4 passes over a sheave at the surface so arranged as to locate the cable substantially in the center of the borehole.

In Figure 2 parts corresponding to parts in Figure 1 bear the same numeral. The arrangement shown in Figure 2 differs from that shown in Figure 1 in that the output of the thyratron is rectified and transmitted to the surface as a direct current. To this end the primary 7 is connected to the ground through a condenser 20. Between the primary 7 and condenser 20 is connected the output end of a rectifier 21 to which the output of thyratron 15 is fed. At the surface the generator 6 is connected to the ground through a condenser 22. Since the output end of rectifier 21 is connected to conductor 5 on the same side of each of condensers 20 and 22 and the other sides of the latter are grounded, the direct current voltage across condenser 22 will always be a definite function of the voltage across condenser 20, the difference between them being accounted for by the capacitative effect of the cable. As a matter of fact, the cable serves a useful purpose in this respect, since it eliminates some of the more or less meaningless wiggles from the voltage across condenser 22 a voltage the variations in which are smoother and easier to interpret.

Connected across condenser 22 is a low pass filter 23 the output of which is delivered to a direct current amplifier 24 of known construction which, in turn, delivers its output to a recorder 25 which, in this case, is a recording galvanometer, the movement of the sensitized strip of which is synchronized with the movement of the bomb in the borehole. It may be mentioned here that the filter 23 is a low pass type and serves the purpose of keeping the power supply from generator 6 from reaching the direct current amplifier.

The nature and objects of the present invention having been thus described and illustrated what is claimed as new and useful and is desired to be secured by Letters Patent is:

1. A method for logging boreholes by measurement of the gamma ray intensity therein at various levels which comprises moving a bomb containing a Geiger-Müller counter along said borehole, delivering alternating power current to said bomb, converting said current into direct current in the bomb, delivering said direct current to the Geiger-Müller counter, transmitting the output of the Geiger-Müller counter to the surface through the same conductor which carries the alternating current to the bomb, and recording said output at the surface while excluding said power current from the recording circuit.

2. A method for logging boreholes by the measurement of the gamma ray intensity therein at various levels which comprises moving a bomb containing a Geiger-Müller counter along said borehole, delivering alternating power current to said bomb, converting said current into direct current in said bomb, delivering said direct current to the Geiger-Müller counter, converting the output of said Geiger-Müller counter into a pulsating current having high frequency components, transmitting selected high frequency components of said pulses of a frequency substantially different from that of the power current to the conductor which carries the alternating power current to the bomb and recording at the surface a value which is a function of said high frequency components while excluding said power current from the recording circuit.

3. A method for logging boreholes by measurement of the gamma ray intensity therein at various levels which comprises moving a bomb containing a Geiger-Müller counter along said borehole, delivering alternating power current of low voltage to said bomb, converting said current into direct current of high voltage in the bomb, delivering said direct current to the Geiger-Müller counter, transmitting the output of the Geiger-Müller counter to the surface through the same conductor which carries the alternating power current to the bomb and recording said output at the surface while excluding said power current from the recording circuit.

4. An apparatus for logging boreholes by measurement of the gamma ray intensity therein at various levels which comprises a bomb adapted to be lowered in a borehole, a cable carrying a single electrical conductor for suspending said bomb in said borehole, a source of alternating power current adapted to be arranged at the surface and connected to said conductor, a Geiger-Müller counter in said bomb electrically connected to said conductor, a rectifier interposed between said conductor and said Geiger-Müller counter, an amplifier connected to the output of said Geiger-Müller counter having its output connected to said conductor, means at the surface for recording a function of the output of said amplifier and means for excluding said power current from the recording circuit.

5. An apparatus according to claim 4 in which a stepup transformer is arranged between the conductor and the rectifier.

6. An apparatus according to claim 4 in which the amplifier is of the vacuum tube type and means are provided for connecting the plate of said amplifier to the rectifier.

7. An apparatus for logging a borehole comprising a bomb adapted to be lowered into the borehole, a cable for suspending said bomb carrying a single conductor, a source of alternating current adapted to be disposed at the surface connected to said conductor, a transformer in said bomb having its primary connected to said conductor, a rectifier connected to the secondary of said transformer, a Geiger-Müller counter arranged in said bomb, means for delivering the output of said rectifier to said Geiger-Müller counter, an amplifier in said bomb adapted to receive the output of said Geiger-Müller counter, a second rectifier in said bomb adapted to receive the output of said amplifier and having its output connected to said primary, and means adapted to be disposed at the surface for recording the output of said second rectifier.

8. In a device for geophysical exploration in which an instrument is lowered into an opening in the earth to measure characteristics of the surrounding strata and a recorder is positioned at the surface to record the measurements, the improvement which comprises as means to connect the measuring instrument with the recorder and with at least one source of power also positioned on the surface, a cable connected to the measuring instrument and extending to the surface to support the measuring instrument and form an electrical connection thereto, a source of electrical current connected to said cable and the ground at the upper end of the cable, means at the measuring device connected between the ground and the lower end of the cable for receiving said current and utilizing it as power to operate the measuring device, means at the measuring device for impressing upon the surrounding earth and the supporting cable through a filter that will exclude the main power supply current, an electrical current indicative of the measurement being made, means at the surface end of the cable for removing said measurement indicating current from the cable and ground through a similar filter and means for recording the indicated measurement.

9. In a device for geophysical exploration in which an instrument is lowered into an opening in the earth to measure characteristics of the surrounding strata and a recorder is positioned at the surface to record the measurements, the improvement which comprises as means to connect the measuring instrument with the recorder and with at least one source of power also positioned on the surface, a cable connected to the measuring instrument and extending to the surface to support the measuring instrument and form an electrical connection thereto, a source of electrical current connected to said cable and the ground at the upper end of the cable, means at the measuring device connected between the ground and the lower end of the cable for receiving said current and utilizing it as power to operate the measuring device, means at the measuring device for impressing upon the surrounding earth and the supporting cable an electrical current indicative of the measurement being made, means at the surface end of the cable for removing said measurement indicating current from the cable and ground through a filter that will exclude the main power supply current, and means for recording the indicated measurement.

10. In an apparatus for radiological exploration comprising a source of operating current to produce electrical signals in response to radioactive radiations, and a recorder for said signals, a single insulated conductor cable electrically connecting said source of operating current with said detector system to form a circuit comprising the ground as a return lead, means forming part of said detector system for passing to said conductor the signals produced by said detector system in response to radioactive radiations, and filtering means at the recorder electrically connecting said recorder with said detector system through said single conductor to form a circuit comprising the ground as a return lead, said filtering means being adapted to separate from each other the detector system signals and the operating current passing in said conductor.

11. In an apparatus for radiological exploration of earth strata penetrated by a bore hole including a source of operating current at the surface of the earth, a detector system adapted to be lowered into the bore hole and to be energized by said operating current to produce electrical signals in response to radioactive radiations which are functions of the geological strata surrounding the bore hole, a recorder for said signals, means for moving said detector system in the bore hole, a single insulated conductor cable for supporting said detector system within the bore hole and for forming with the ground a circuit electrically connecting said source of operating current with said detector system, means forming part of said detector system for passing to said conductor the signals produced by said detector system in response to radioactive radiations, and filtering means at the recorder electrically connecting said recorder with said detector system through said single conductor to form a circuit with the ground, said filtering means being adapted to separate from each other the detector system signals and the operating current flowing in said conductor.

12. In an apparatus for geophysical exploration of the earth's strata penetrated by a bore hole, including a source of operating current at the surface of the earth, a detector system adapted to be lowered into the bore hole and to be energized by said operating current to produce signals which are functions of the geological strata surrounding the bore hole, a recorder for said signals, and means for moving said detector system in the bore hole, the improvement which comprises an insulated single conductor cable for supporting said detecting system within the bore hole and for forming with the ground a circuit connecting said source of operating current with said detector system, said circuit adapted to convey signals from said detector system to said recorder and to convey operating current from said operating current source to said detector system, and filter means interposed in said circuit to separate from each other the detector system signals and the operating current flowing in said conductor cable.

13. In an apparatus for geophysical exploration including a source of operating current, a detector system energized by said operating current and adapted to produce signals which are functions of intelligence being sought, and a recorder for signals, the improvement which comprises an insulated single conductor cable forming with the ground a circuit connecting said source of operating current with said detector system, said circuit adapted to convey signals from said detector system to said recorder and to convey operating current from said operating current source to said detector system, and filter means interposed in said circuit to separate from each other the detector system signals and the operating current flowing in said conductor cable.

ALEX FROSCH.